United States Patent [19]
Charlton

[11] Patent Number: 5,949,434
[45] Date of Patent: Sep. 7, 1999

[54] METHOD AND APPARATUS FOR SCALING GRAPHIC IMAGES

[76] Inventor: Paul Charlton, 696 Windsor Ter., Sunnyvale, Calif. 94087-2328

[21] Appl. No.: 08/821,406

[22] Filed: Mar. 20, 1997

[51] Int. Cl.⁶ .................................................. G06T 3/40
[52] U.S. Cl. .................. 345/439; 345/131; 345/136; 382/300; 395/102; 348/581; 358/447
[58] Field of Search .................................. 345/136, 137, 345/131, 439; 382/298, 299, 300; 395/109, 102; 348/581; 358/447

[56] References Cited

U.S. PATENT DOCUMENTS

| | | | |
|---|---|---|---|
| 4,490,797 | 12/1984 | Staggs | 345/431 |
| 5,107,346 | 4/1992 | Bowers et al. | 358/447 |
| 5,113,455 | 5/1992 | Scott | 358/451 |
| 5,778,158 | 7/1998 | Fujii et al. | 395/102 |
| 5,835,687 | 11/1998 | Brown et al. | 358/447 |

*Primary Examiner*—Mark K. Zimmerman
*Assistant Examiner*—Kimbinh T. Nguyen
*Attorney, Agent, or Firm*—Blakely, Sokoloff, Taylor & Zafman LLP

[57] ABSTRACT

An innovative technique for minimizing the visual artifacts created by scaling an image is disclosed. More particularly, a factor that adds a degree of pseudo-randomness to the location of values generated as output during the scaling process is incorporated in one embodiment, the initial value of the error term used to generate the series is set on a semi-random basis such that the output pixels generated are offset from one another on different rows or columns of the image. Thus, any banding artifacts which are created using the prior art process will be minimized due to the shifting of pixels.

15 Claims, 8 Drawing Sheets

```
HGLOBAL Scale32DIB(BITMAPINFOHEADER *theInputDIB,unsigned long newWidth,unsigned long new3Height) {
    HGLOBAL retval = NULL;
    if (theInputDIB) {
            unsigned long oldWidth = theInputDIB->biWidth;
            unsigned long oldHeight = theInputDIB->biHeight;

unsigned long newSize = sizeof(BITMAPINFOHEADER);
            newSize += newWidth * newHeight * 4;

retval = GlobalAlloc(GMEM_MOVEABLE,newSize);
            if (retval)         {
              BITMAPINFOHEADER *newHeader = (BITMAPINFOHEADER *) GlobalLock (retval);
              if (newHeader) {
                  memset(newHeader,0,sizeof(newHeader));
                  newHeader->biSize            = sizeof( BITMANPINFOHEADER ) ;
                  newHeader->biWidth           = newWidth;
                  newHeader->biHeigth          = newHeight;
                  newHeader->biPlanes          = 1;
                  newHeader->biBitCount        = 32;
                  newHeader->biCompresssion    = BI_RGB;
                  newHeader->biSizeImage       = newSize - sizeof(BITMAPINFOHEADER);
                  newHeader->biXPelsPerMeter   = 0 ;
                  newHeader->biYPelsPerMeter   = 0 ;
                  newHeader->biClrUsed         = 0 ;
                  newHeader->biClrImportant    = 0 ;
                  {
                     unsigned long *destPixels = (unsigned long *) ((unsigned char *)(newHeader) + sizeof(BITMAPIN
FOHEADER) );
                     unsigned long destRowBytes = newWidth << 2;
                     unsigned long *srcRow = (unsinged long *) (unsigned char *) (theInputDIB) + sizeof(BITMAPINFO
HEADER) );
                     unsigned long srcRowBytes = oldWidth << 2;
                     unsigned long rowsLeft;
                     unsigned long modHeightCounter = 0;
                     //for each row
                     for (rowsLeft = newHeight; rowsLeft--> 0;) {
                        unsigned long *srcPixels = srcRow;

// for each output pixel
                        unsigned long *final Ptr = (unsigned long *)(unsigned char *)destPixels + destRowBytes);
                        unsigned long modWidthCounter = rowsLeft & 0x3; // to prevent vertical banding artifacts
                        if (newWidth == oldWidth) {
                            while (destPixels < finalPtr) {
                                *destPixels++ = *srcPixels++;
                            }
                        } else {           // adding or dropping source pixels
                            while (destPixels < finalPtr) {
                                *destPixels++ = *srcPixels;
                                modWidthCounter =+ oldWidth;
                                while (modWidthCounter >=newWidth) {
                                   modWidthCounter -= newWidth;
                                   srcPixels++;
                                }
                            }
                        }
                        if (newHeight == oldHeight) {
                            srcRow += oldWidth
                        } else {
                              modHeightCounter += oldHeight;
                              while (modHeightCounter >= newHeight) {
                                 modHeightCounter -= newHeight;
                                 srcRow += oldWidth;
                              }
                        }
                     }
                  }
                  GlobalUnlock(retval);
              }
          }
     }
     return retval;
```

Figure 3a

| | | |
|---|---|---|
| destPixels | ⟹ | output pixels |
| rowsLeft | ⟹ | number of rows left to process |
| newHeight | ⟹ | desired number of output rows |
| oldHeight | ⟹ | desired number of output columns |
| modWidthcounter | ⟹ | error term for row |
| newWidth | ⟹ | number of pixels in row output |
| oldWidth | ⟹ | number of pixels in row input |
| modHeightcounter | ⟹ | column error term |
| srcPixels | ⟹ | input pixels |
| destPixels | ⟹ | output pixels |

FIG. 3b

| Original | 1 | 2 | 3 | 4 | 5 | 6 | 7 | 8 | 9 |
|---|---|---|---|---|---|---|---|---|---|
| 0 | 1 | 2 | 3 | 4 | 5 | 6 | 7 | 8 | 9 |
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |

| GEM Stretch | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 0 | 1 | 1 | 2 | 3 | 4 | 5 | 6 | 7 | 8 | 9 |
| 10 | 10 | 11 | 12 | 13 | 14 | 15 | 16 | 17 | 18 | 19 |
| 20 | 20 | 21 | 22 | 23 | 24 | 25 | 26 | 27 | 28 | 29 |
| 30 | 30 | 31 | 32 | 33 | 34 | 35 | 36 | 37 | 38 | 39 |
| 30 | 31 | 31 | 32 | 33 | 34 | 35 | 36 | 37 | 38 | 39 |
| 40 | 40 | 41 | 42 | 43 | 44 | 45 | 46 | 47 | 48 | 49 |
| 50 | 50 | 51 | 52 | 53 | 54 | 55 | 56 | 57 | 58 | 59 |
| 60 | 60 | 61 | 62 | 63 | 64 | 65 | 66 | 67 | 68 | 69 |
| 60 | 61 | 61 | 62 | 63 | 64 | 65 | 66 | 67 | 68 | 69 |
| 70 | 70 | 71 | 72 | 73 | 74 | 75 | 76 | 77 | 78 | 79 |
| 80 | 80 | 81 | 82 | 83 | 84 | 85 | 86 | 87 | 88 | 89 |
| 90 | 91 | 91 | 92 | 93 | 94 | 95 | 96 | 97 | 98 | 99 |

FIG. 4d

METHOD AND APPARATUS FOR SCALING GRAPHIC IMAGES

BACKGROUND OF THE INVENTION

1. Field of the Invention

The present invention relates to the field of computer generated images. More particularly, to the scaling of digital images.

2. Art Background

In computer applications, it often is necessary to scale an image. To expand or "stretch" an image, selective pixels are duplicated in the horizontal and/or vertical directions. Similarly, to reduce or "shrink" an image, selected pixels are dropped. However, one undesirable effect is the visual artifacts created. These artifacts result in horizontal and/or vertical bands in the image. In particular, horizontal replication or dropping produces vertical bands, and vertical replication or dropping results in horizontal bands.

Filtering techniques can be used to remove the bands. However, as filtering is computationally intensive, filtering adds substantial overhead to the system.

SUMMARY OF THE INVENTION

The system and method of the present invention provides an innovative technique for minimizing the visual artifacts created by scaling an image. More particularly, the present invention incorporates a factor that adds a degree of pseudo-randomness to the location of values generated as output during the scaling process. In one embodiment, this is provided by modifying the error term used in a scaling technique based on Bresenham's algorithm. More particularly, in one embodiment, the initial value of the error term used to generate the series is set on a semi-random basis such that the output pixels generated are offset from one another on different rows or columns of the image. Thus, any banding artifacts which are created using the prior art process will be minimized due to the shifting of pixels.

In another embodiment, the series terms utilized in the algorithms are pre-computed for the process and stored. During actual processing of the image, these terms are accessed from storage according to an index. To minimize the scaling artifacts, the initial value of the index is varied from row to row. Other modifications also can be performed to minimize the banding artifacts. For example, an M×N series can be implemented for even rows and a 2M×2N series implemented for odd rows. Thus, any bands that would have been generated are broken up between even and odd rows. Still, in another embodiment, artifacts are minimized by processing right to left on predetermined rows, such as even rows, and left to right on the remaining rows.

All the above techniques require little additional processing overhead and enable fast and efficient rendering of scaled images with minimal artifacts.

BRIEF DESCRIPTION OF THE DRAWINGS

The objects, features and advantages of the present invention will be apparent to one skilled in the art in the following detailed description in which:

FIGS. 3a and 3b is pseudo code illustrating one embodiment of the present invention which utilizes Bresenham's algorithm for scaling of images.

DETAILED DESCRIPTION

In the following detailed description, for purposes of explanation, numerous details are set forth in order to provide a thorough understanding of the present invention. However, it will be apparent to one skilled in the art that these specific details are not required in order to practice the present invention. In other instances, all known electrical structures and circuits are shown in block diagram form in order not to obscure the present invention unnecessarily.

Figure 1:
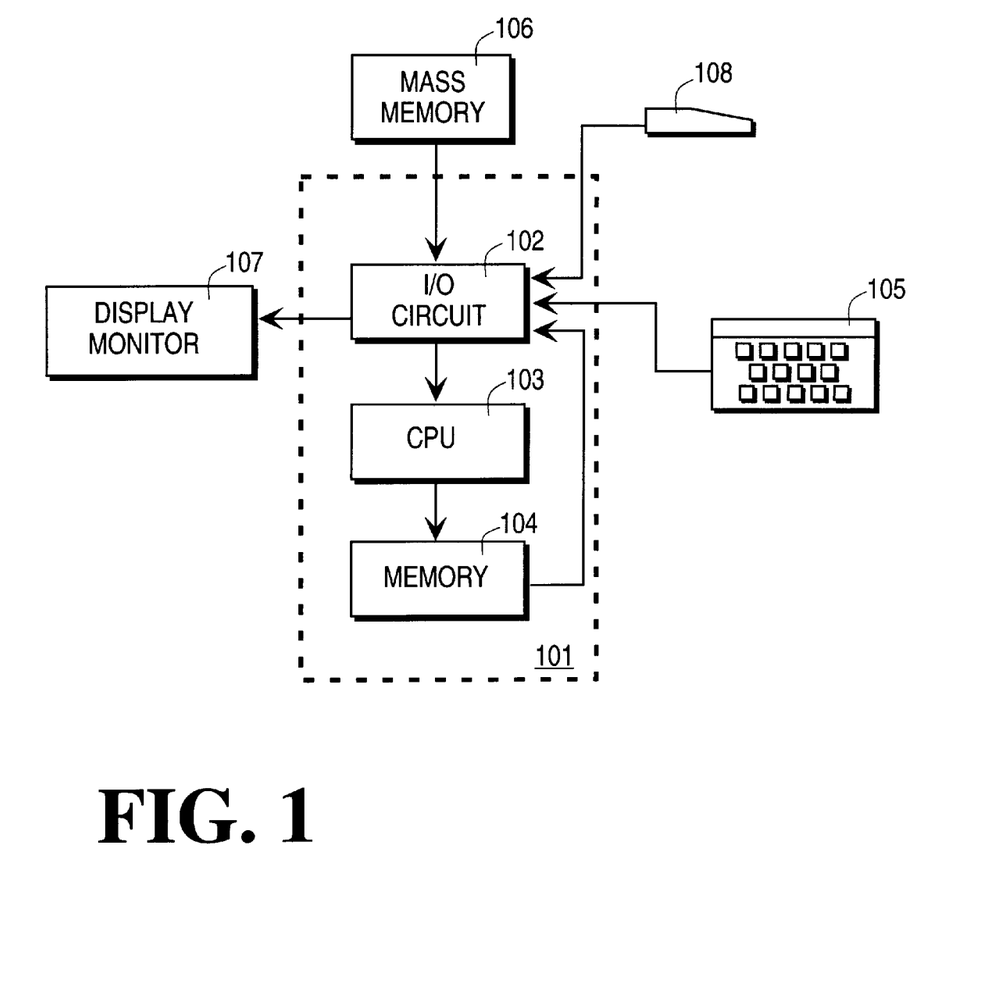
FIG. 1 is an exemplary system that operates in accordance with the teachings of the present invention.

FIG. 1 illustrates a typical computer-based system for scaling images in accordance with the teachings of the present invention. Shown is computer 101, which includes three major components: the first of these is the Input/Output (I/O) circuit 102, which is used to communicate information in an appropriately structured form to and from other parts of the computer 101. Also shown as part of computer 101 is the central processing unit (CPU) 103 and memory 104. These latter two elements are those typically found in most general-purpose computers and almost all special purpose computers. In fact, the several elements contained within computer 101 are intended to be representative of this broad category of processors. Also shown is an input device 105 shown in a typical embodiment as a keyboard. It should be understood however, that the input device may actually be a card reader, magnetic or paper tape reader, or other well-known input device (including, or course, another computer). A mass memory device 106 typically is coupled to the I/O circuit 102 and provides additional storage capability for the computer 101. The mass memory may include other programs and the like, and may take the form of magnetic or paper tape reader or other well-known device. It will be appreciated that the data retained in mass memory 106 may, in appropriate cases, be incorporated in a standard fashion into computer 101 as part of memory 104. In addition, the display monitor is illustrated which displays messages and other communications to the user. Such a display monitor may take the form of any of several well-known varieties of display monitors. Preferably, the display monitor 107 may also display graphic images in accordance with the teachings of the present invention. A cursor control 108 is used to select command modes and edit input data and in general provide a more convenient means to input information into the system.

Although it is preferred that the method for minimizing artifacts and scaled images is implemented in a computer system, it is contemplated that specially designed logic also can be utilized to process the data in accordance with the teachings of the present invention to minimize the visual artifacts created during the scaling process.

Figure 2:
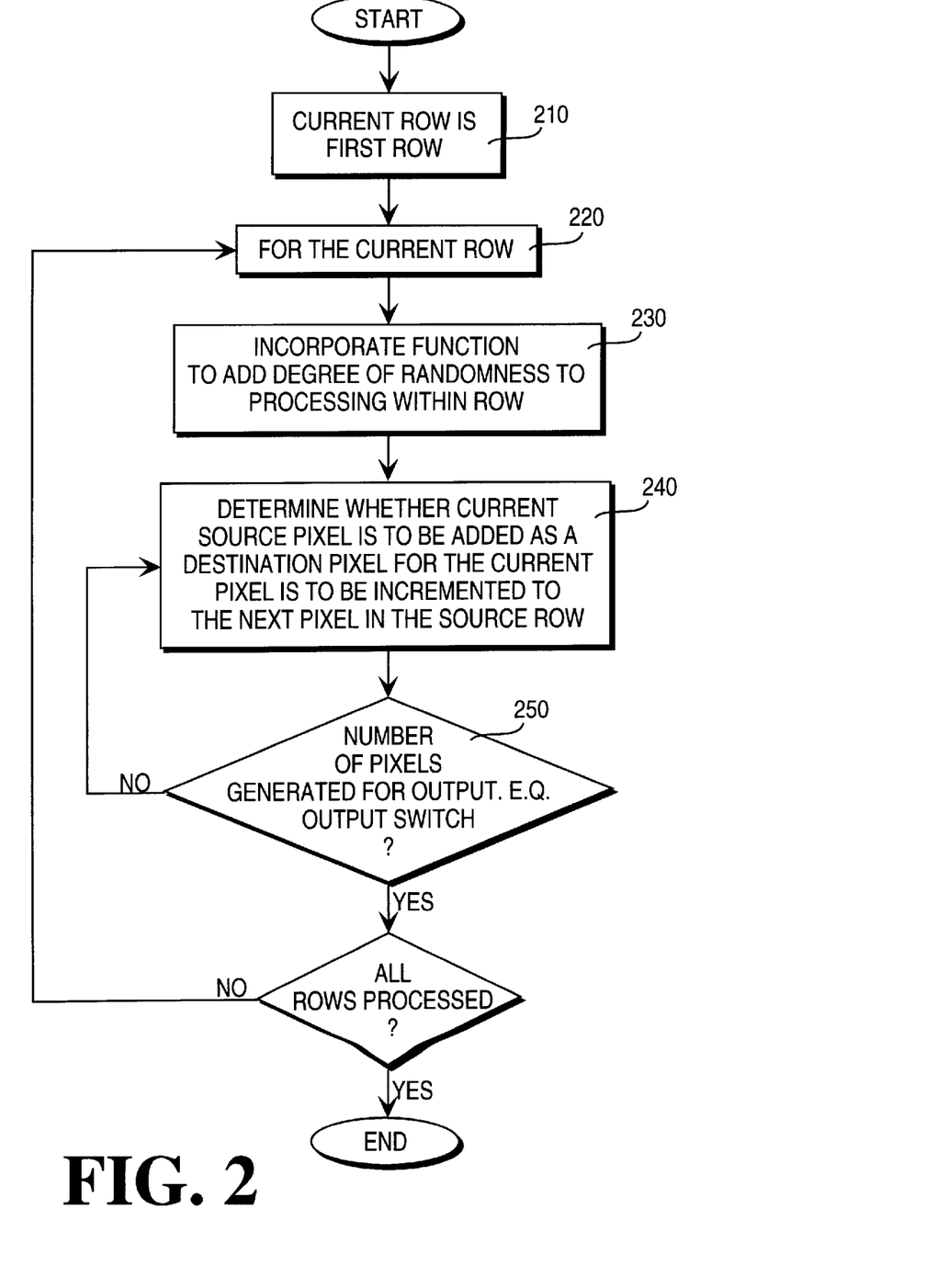
FIG. 2 is a simplified flow diagram illustrating one embodiment of the present invention.

The process for scaling digital images while minimizing visual artifacts, will be discussed with reference to FIG. 2. In the present embodiment, the process for scaling follows Bresenham's algorithm. An example of this is discussed in *Graphics Gems III*, edited by David Kirk, (1992, Academic Press, Inc.) pages 4–7, and pages 411–413. Using this process, the image is processed on a row-by-row or column-by-column basis, and then each row or column is processed pixel by pixel. FIG. 2 illustrates that each row is individually processed; however, the process applies similarly to processing on a column-by-column basis. Referring to FIG. 2, at step 210, the current row is the first row to be processed. At step 220 for the current row, a factor is incorporated to add a degree of pseudo-randomness to processing within the row, step 230. At step 240 it is determined whether the current source pixel is to be added as a destination pixel, or the current pixel is to be incremented to the next source pixel in the row. When the resultant process is to stretch the image, the pixel is added in as a destination pixel at least one time. If the process to be performed is a shrinking process, it may be determined that the current source pixel is to be incremented to the next pixel, thereby dropping the current source pixel as a destination pixel. This technique is well-known and described in *Graphic Gems III*. At step 250, if the number of pixels generated for output width does not equal the output width, then the process continues until all pixels in the row have been processed. Once all the pixels in the row have been processed, step 260 determines whether all the rows have been processed. If all the rows have not been processed, then the next row is selected and steps 220, 230, 240 and 250 are again processed for the new row.

As noted previously, the generation of banding artifacts is quite common due to similarity of pixels between adjacent rows. The factor incorporated into the process, in accordance with the teachings of the present invention, adds a degree of pseudo-randomness to the pixels that are added or repeated during the process such that pixels that previously would have occurred in columns and rows repeatedly producing the bands, are now shifted by one or more pixels to break up the bands.

Figure 3B:
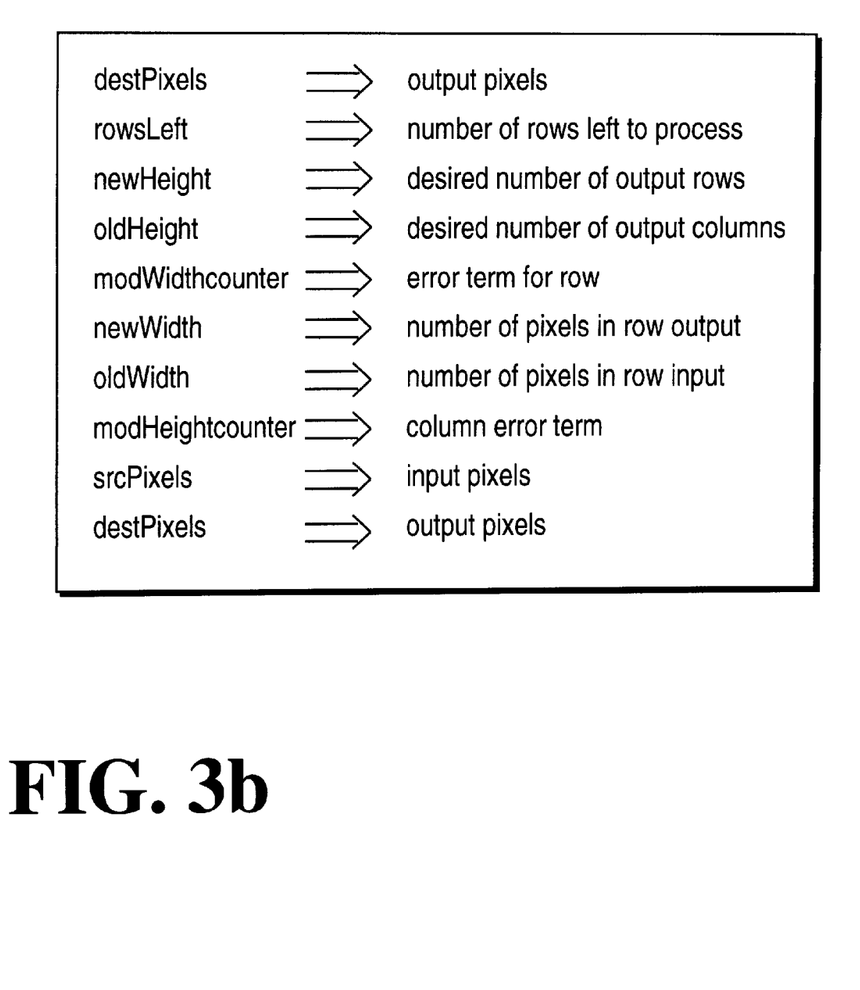

Exemplary code for one embodiment of a process is set forth in FIG. 3. In particular, the variable modWidthCounter is set to be equal to the variable rowsLeft (corresponding to the number of rowsLeft to process) mod 4. Thus, the initial value used for modWidthCounter will vary from row to row. The same processing loops can be applied to columns of pixels to stretch or shrink the image in the alternative direction.

Figure 4A:
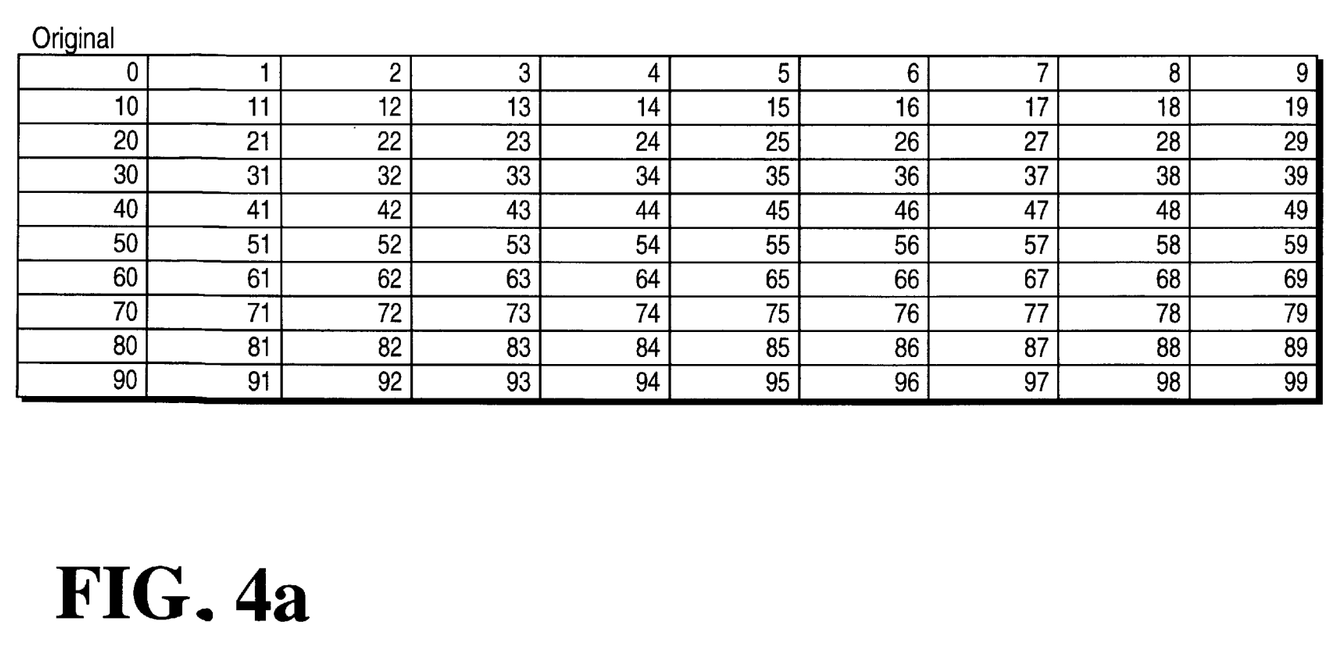
FIG. 4a is an original 10×10 image and FIGS. 4b and 4c are resultant 13×13 images that illustrate the banding artifacts that are generating during scaling of an image using prior art techniques.
Figure 4B:
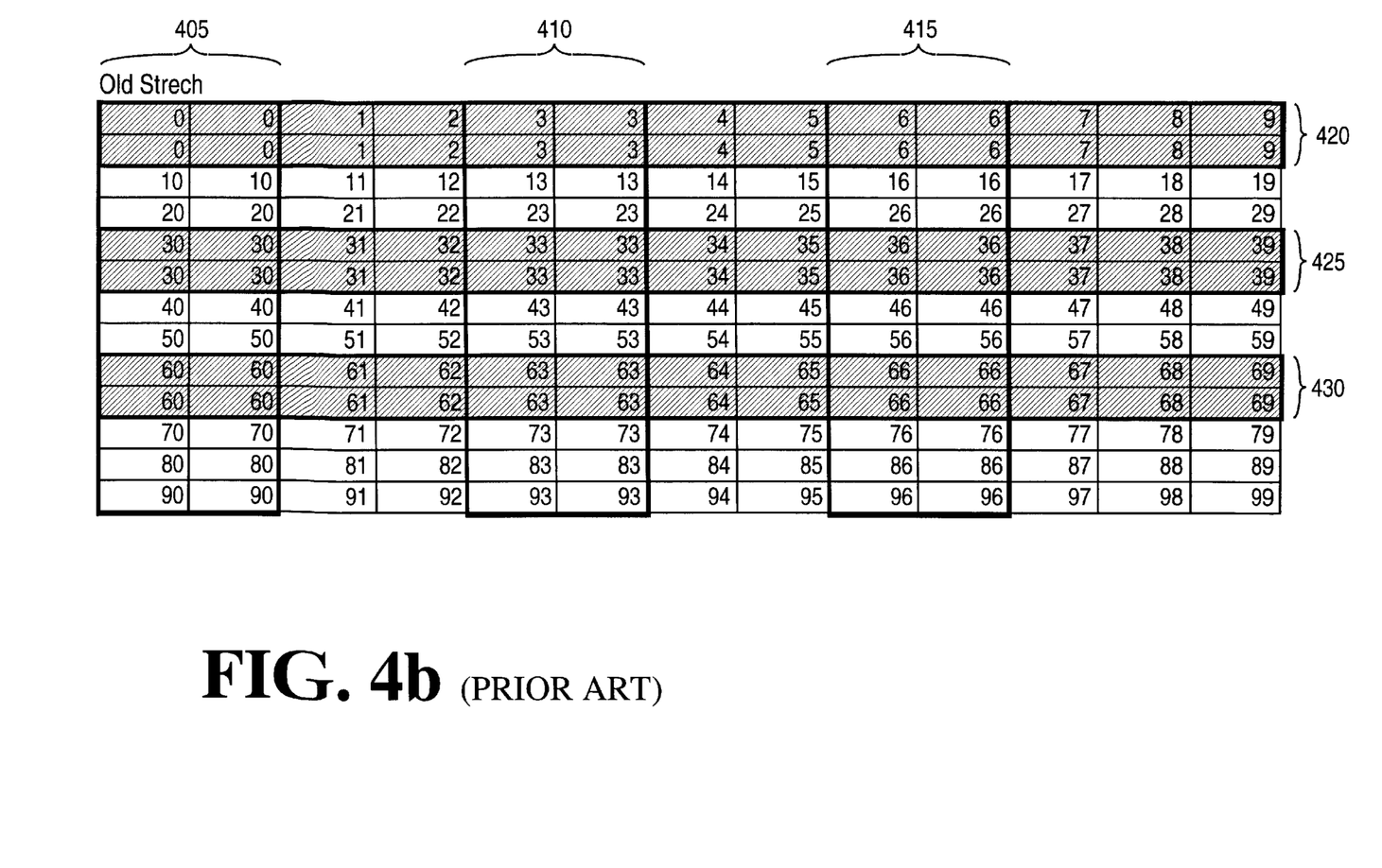
Figure 4C:
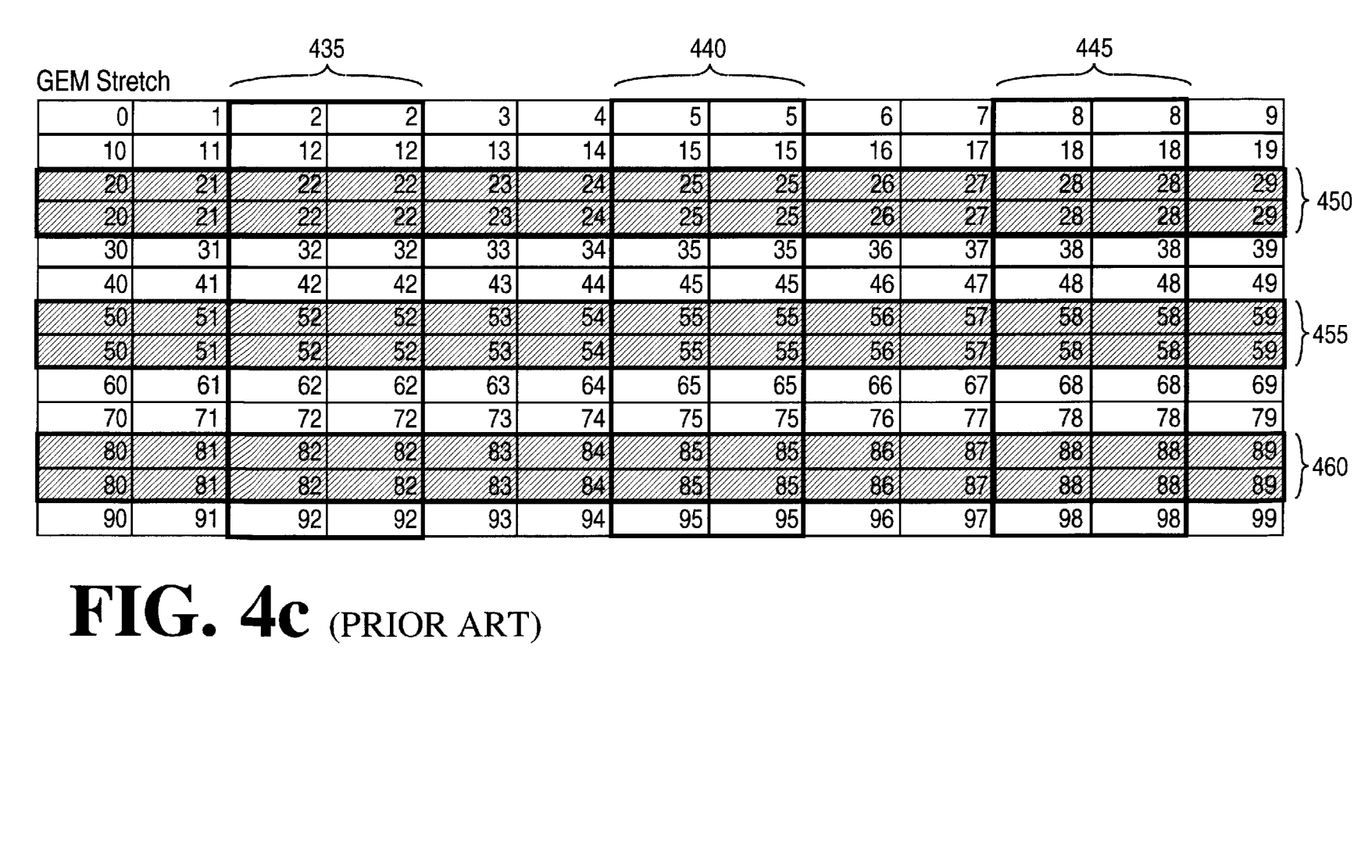
Figure 4D:
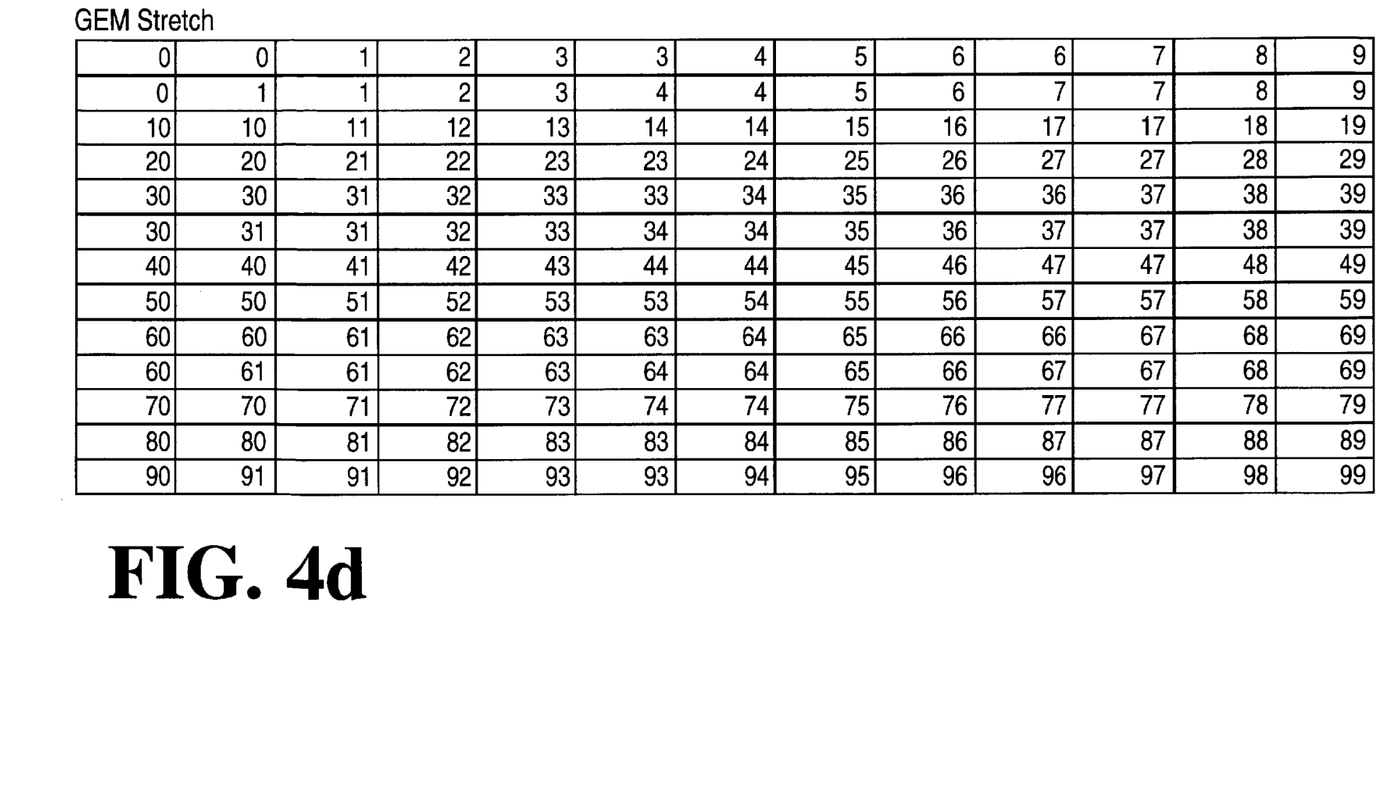
FIG. 4d illustrates the same 13×13 image after scaling in accordance with the teachings of the present invention.

The visual effect achieved by utilizing this process is illustrated by FIGS. 4a, 4b, 4c and 4d. FIG. 4a illustrates an exemplary 10×10 image. The numbers presented in the array are exemplary numeric pixel values representative of different colors and intensities of pixels. FIGS. 4b and 4c illustrate the resultant scaled 13×13 image using prior art scaling processes. Both processes result in images containing vertical and horizontal bands, where adjacent columns and/or rows have duplicate pixel values. for example, bands 405, 410, 415, 420, 425, 430, 435, 440, 445, 450, 455 and 460. However, the same 10×10 image processed in accordance with the teachings of the present invention results in a 13×13 image, shown in FIG. 4d, in which the bands are minimized.

In one embodiment described herein, the factor that introduces some randomness or noise to the processing, thereby minimizing the banding artifacts, is the modification of the initial value of the inner loop which is used to generate elements of the series utilized to determine whether or not a pixel should be output as a destination pixel one or more times during an expansion process, or to determine whether or not a pixel should be dropped during a shrinking process.

Other embodiments also are contemplated. For example, the series for an image can be generated in advance and a table look-up process can be used to retrieve the values as needed to determine whether a pixel should be added or dropped to scale the image. In such an embodiment, it is contemplated that the banding artifacts are minimized by varying the initial index value into the look-up table. This could be done in a random or semi-random manner.

In other embodiments, the direction of the processing can alternate between rows. This also will cause a pixel shift such that the banding artifacts are minimized. For example: even rows can be processed from right to left; even columns from top to bottom; odd rows processed left to right; and odd columns processed from bottom to top.

Another alternative contemplated is to use different size series for the alternating rows. For example, and M×N series can be used for even rows, and a 2M×2N series can be applied to the odd rows. This can easily be achieved by modifying the control parameters of the loops to generate series of the desired size.

The invention has been described in conjunction with the preferred embodiment. It is evident that numerous alternative modifications, variations and uses will be apparent to those skilled in the art in light of the foregoing description.

What is claimed is:

1. A method for scaling groups of pixels consisting of rows or columns of pixels from a current size to a new size, said method comprising the steps of:

for each group, incorporating a factor to add a degree of semi-randomnesss to the scaling process of the group from the current size to the new size, said factor varying between at least two groups; and for each current pixel within the group, determining whether the current pixel is to be added as a destination pixel zero or more times, said determination generated from values derived from the factor.

2. The method as set forth in claim 1, wherein the factor is an initial value of an error term and said step of determining comprises the steps of:

if the error term is greater than or equal to the new size, then decrement the error term by an amount equal to the new size, and update the current pixel to be a next pixel within the group;

else if the error term is less than the new size, then output the current pixel as a destination pixel;

and increment the error term by an amount equal to the current size.

3. The method as set forth in claim 1, wherein the factor is an initial index value to an array of series terms, each term identifying whether the current pixel for a particular scale is to be added as a destination pixel.

4. The method as set forth in claim 1, wherein the factor is a direction the pixels are processed.

5. The method as set forth in claim 1, wherein the factor comprises the selection of a m×n series or multiple of m×n series of terms that indicate whether the current pixel is to be added as a destination pixel one or more times.

6. A computer system comprising:

a memory;

a display device;

a processor coupled between the memory and display device, said processor configured to scale groups of pixels capable of being generated on the display device from a current size to a new size, said processor, for each group, configured to incorporate a factor to add a degree of semi-randomness to scale the group from the current size to the new size, said factor varying between at least two groups, and for each current pixel within the group, said processor configured to determine whether the current pixel is to be added as a destination pixel zero or more times, said determination generated from values derived from the factor.

7. The system as set forth in claim 6, wherein the factor is an initial value of an error term and said process or further configured to determine whether the current pixel is to be added as a destination pixel zero or more times by decrementing the error term by an amount equal to the new size and updating the current pixel to be a next pixel within the group if the error term is greater than or equal to the new size and outputting the current pixel as a destination pixel if the error term is less than the new size, and incrementing the error term by an amount equal to the current size.

8. The system as set forth in claim 6, wherein the factor is an initial index value to an array of series terms, each term identifying whether the current pixel for a particular scale is to be added as a destination pixel.

9. The system as set forth in claim 6, wherein the factor is a direction the pixels are processed.

10. The system as set forth in claim 6, wherein the factor comprises the selection of a m×n series or multiple of m×n series of terms that indicate whether the current pixel is to be added as a destination pixel one or more times.

11. A computer readable medium containing executable instructions which, when executed in a processing system, causes the system to perform the steps for scaling groups of pixels consisting of rows or columns of pixels from a current size to a new size comprising:

for each group, incorporating a factor to add a degree of semi-randomnesss to the scaling process of the group from the current size to the new size, said factor varying between at least two groups; and for each current pixel within the group, determining whether the current pixel is to be added as a destination pixel zero or more times, said determination generated from values derived from the factor.

12. The medium as set forth in claim 11, wherein the factor is an initial value of an error term and said step of determining comprising the steps of:

if the error term is greater than or equal to the new size, then decrement the error term by an amount equal to the new size, and update the current pixel to be a next pixel within the group;

else if the error term is less than the new size, then output the current pixel as a destination pixel;

and increment the error term by an amount equal to the current size.

13. The medium as set forth in claim 11, wherein the factor is an initial index value to an array of series terms, each term identifying whether the current pixel for a particular scale is to be added as a destination pixel.

14. The medium as set forth in claim 11, wherein the factor is a direction the pixels are processed.

15. The medium as set forth in claim 11, wherein the factor comprises the selection of a m×n series or multiple of m×n series of terms that indicate whether the current pixel is to be added as a destination pixel one or more times.

* * * * *